June 4, 1968

MINORU MATSUDA 3,386,544

RATCHET TYPE COASTER BRAKE APPARATUS

Filed July 6, 1966

Minoru Matsuda

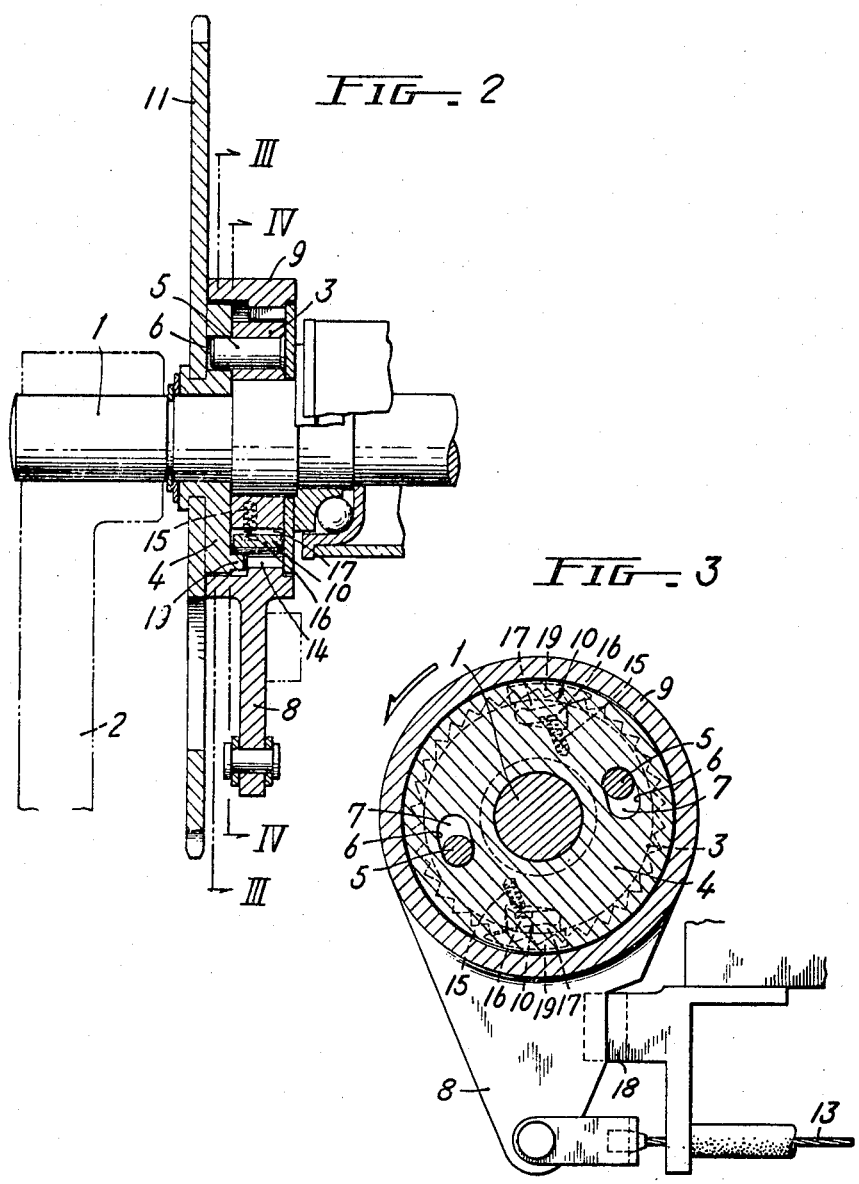

United States Patent Office 3,386,544
Patented June 4, 1968

3,386,544
RATCHET TYPE COASTER BRAKE APPARATUS
Minoru Matsuda, Tokyo, Japan, assignor to Kabushiki Kaisha Honda Gijutsu Kenkyusho, Kita-adachi-gun, Siatama-ken, Japan
Filed July 6, 1966, Ser. No. 563,226
Claims priority, application Japan, July 7, 1965, 40/40,313
9 Claims. (Cl. 192—6)

ABSTRACT OF THE DISCLOSURE

Brake apparatus for a two wheel vehicle with pedals in which a drive member operated by the pedals operates to drive a driven member with play and is engageable with a brake operating member through a ratchet mechanism which is automatically switched between an operative and an inoperative condition when the relative position of the drive member and the driven member is respectively delayed and advanced in phase within the range of said play as caused by forward or backward drive of the pedals by the operator.

---

This invention relates to ratchet type coaster brake apparatus used chiefly for a bicycle or a motorized two-wheel vehicle with pedals.

Such ratchet type apparatus is known and is advantageous in that the necessary space in the axial direction can be minimized. However, this known apparatus is deficient in that a braking operation is produced when it is driven in reverse fashion from the load side of a transmission system. Namely, in the case of a bicycle, a reverse rotation of the rear wheel thereof during its rearward movement produces a braking operation and its further rearward movement is thereby braked.

There has been proposed to solve the above problem, a ratchet claw which is manually retracted into a claw housing, but this is troublesome in operation because it is not automatic. It has also been proposed, in the case of a bicycle, that the ratchet claw be raised automatically by the weight of a driver and lowered automatically into a housing when the bicycle is empty, so that the rearward movement of the bicycle may be allowed only when not being ridden by the driver. However, this is also not satisfactory since the bicycle cannot be moved rearwardly when loaded with baggage or when occupied by a driver.

An object of the invention is to provide coaster brake apparatus which operates automatically to prevent a braking operation when the normally driven wheel is rotated in reverse.

According to the present invention, a driving member connected to an input device is in engagement with a drive member connected to a load with a circumferential play or gap and is also in engagement with a brake operating member through a ratchet mechanism which is switched automatically between an operative and an inoperative condition when the relative position of the driving member to the driven member is respectively delayed and advanced in phase within the range of said play.

An embodiment of the present invention will now be described with reference to the accompanying drawings, wherein:

FIGURE 2 is a sectional view taken along line II—II in FIG. 1;

FIGURE 3 is a sectional view taken along line III—III in FIG. 2;

Figure 1:
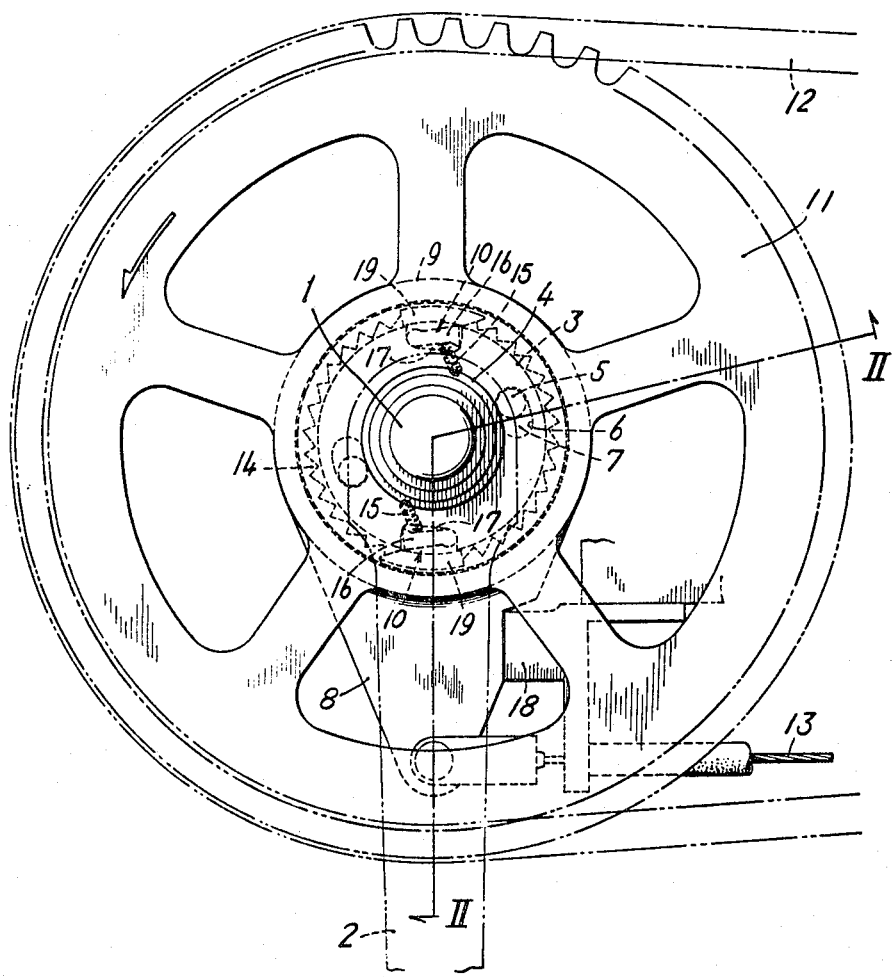
FIGURE 1 is a front view of one embodiment of the invention.

The drawings show the case when the apparatus is applied to a pedal crankshaft portion of a bicycle. Numeral 1 denotes a crankshaft having at its end a crank arm 2 for a pedal. An annular shaped driving member 3 is fixed to the shaft 1 and adjacent thereto is an annular shaped driven member 4 loosely mounted on the same shaft 1. These two members 3 and 4 are engaged with one another by the accommodation of pins 5 of member 3 in corresponding elongated slots 6 of member 4 such that a circumferential gap or play 7 is established between members 3 and 4. Additionally, a pivotal brake operating member 8 surrounds members 3 and 4 and an annular portion 9 of the brake member is engageable with the driving member 3 via a ratchet mechanism 10. Though not illustrated in the drawings, there is provided between the rear wheel and the chain wheel, a conventional over-running clutch mechanism which operates to transmit the regular direction of rotation from the chain wheel to the rear wheel while preventing drive from the rear wheel, that is, the back load, from being transmitted to the chain wheel. The driven member 4 is connected to the load, i.e. the rear wheel, through a chain wheel 11 fixed to the periphery of member 4 and through a chain 12 engaged with said wheel 11. The brake operating member 8 is connected at one end to any desired type of conventional brake through a brake cable 13. The ratchet mechanism 10 comprises a ratchet wheel 14 on the inner surface of the annular portion 9 and a pair of ratchet claws 16 at the periphery of the member 3 and urged to project outwards by respective springs 15. Each ratchet claw 16 is mounted in a recess or housing 17 for pivotal movement between a retracted inoperative position and a projecting operative position. Numeral 18 denotes a stop for limiting the magnitude of pivotal movement of the brake operating member 8.

Cams 19 are provided on the inner surface of the driven member 4 and project therefrom at positions where each is opposite a respective ratchet claw 16, so that when the relative position of the driving member 3 and the driven member 4 is moved forwards and rearwards within the range of the play 7, each cam 19 is advanced or retreated in relation to the corresponding ratchet claw 16 to switch the same between positions where the claw is retracted in housing 17 or extended therefrom. Thereby, cams 19 serve as a means for automatically switching each ratchet claw 16 between the operative projecting position and the inoperative retracted position. Thus, assuming a normally counter-clockwise direction of rotation of member 3 for forward movement of the bicycle, then if the driving member 3 is delayed in relation to the driven member 4 within the range of the play 7 as shown in FIG. 5, i.e. the driven member 4 is advanced in phase in relation to the driving member 3, each cam 19 is advanced in phase relation with respect to each corresponding ratchet claw 16 so that the claw 16 is not depressed by the cam 19 and the claw projects by the action of its spring 15 to an operative position. If, however, the phase is reversed, each cam 19 is moved to the position in FIG. 4 to push the claw 16 to its retracted position.

The operation of the invention will now be described for the case of a bicycle.

Figure 4:
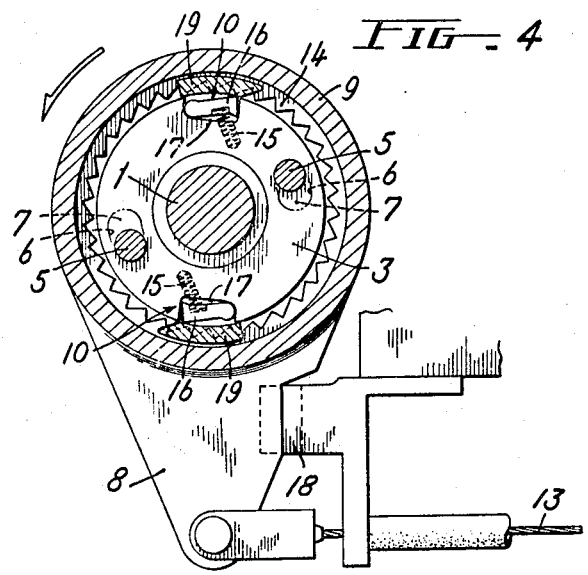
FIGURE 4 is a sectional view taken along line IV—IV in FIG. 2.
Figure 5:
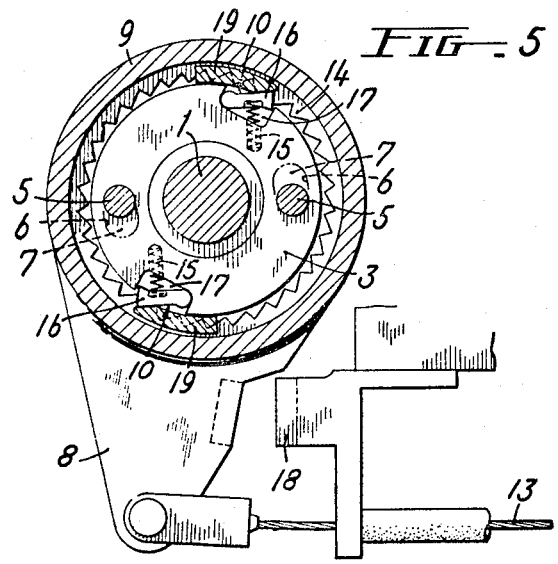
FIGURE 5 is a sectional view similar to that in FIG. 4, but for a switched condition.

If the driving member 3 is rotated by the pedals in the regular counter-clockwise direction of rotation shown by the arrow in FIG. 3, member 3 is advanced in phase in relation to the driven member 4 as shown in FIG. 4 so that the ratchet mechanism 10 is inoperative. Consequently, the brake operating member is inoperative and the power is transmitted through the driving member 3 and the pins 5 to the driven member 4, which in turn drives the rear wheel to obtain an ordinary drive of the bicycle. If, in this condition, the driving member 3 is rotated in reverse by action on the pedal, the member 3 is delayed in phase in relation to the driven member as shown in FIG. 5, to make the ratchet mechanism 10 operative, so that the rotation of the driving member 3 is transmitted through the ratchet mechanism 10 to the brake operating member 8 to cause a brake operation. If the case is considered when the bicycle is merely moved rearwards, the driven member 4 is driven from the rear wheel in reverse direction and is delayed in phase in relation to the driving member 3, that is, the driving member 3 is advanced in phase as in the ordinary running or forward drive and thus the ratchet mechanism 10 becomes inoperative, as shown in FIG. 4. Accordingly, the brake operating member 8 is not operative to produce a braking operation. Therefore, the bicycle can be moved rearwards freely.

Thus, in accordance with the invention, a braking operation is caused by reverse direction of rotation of the driving member, but not by reverse direction of rotation of the driven member. Accordingly, in the case of a vehicle such as a bicycle, not only can a braking operation be effected by reverse rotation of the pedal, but it is also possible to move the vehicle rearwards without causing a braking operation. Thus, the present invention can be used not only for vehicles such as bicycles, but also for other applications as well.

Numerous modifications and variations of the invention will now become apparent to those skilled in the art, without departing from the scope and spirit of the invention if defined by the appended claims.

What is claimed is:

1. Braking apparatus comprising a drive member, a driven member drivingly coupled to the drive member with play and having first and second positions relative thereto, brake actuating means, ratchet means between the brake actuating means and the drive member to couple the same together and means for rendering the ratchet means operative and inoperative in accordance with the respective relative positions of said members, said brake actuating means including a ring member encircling said drive member, said ratchet means including teeth on one of the latter members and claws coupled to the other of said latter members and engageable with said teeth, said claws being movable between retracted inoperative position and extended operative position, said means for rendering the ratchet means operative and inoperative comprising cams on the same member with the teeth, said cams being opposite said claws for depressing the claws to inoperative position and for releasing the claws to operative position in correspondence with the relative positions of said drive and driven members.

2. Braking apparatus as claimed in claim 1, wherein said teeth are one the ring member and the claws are coupled to the drive member.

3. Braking apparatus as claimed in claim 1, wherein said drive and driven members are coupled together with play in the circumferential direction, said drive member having an advanced position relative to the driven member during normal direction of drive from the drive member to the driven member and also during reverse drive from the driven member to the drive member, said driven member having an advanced position relative to the drive member during reverse direction of drive from the drive member to the driven member.

4. Braking apparatus as claimed in claim 3, wherein said member to which the claws are coupled have recesses for housing the claws in the retracted inoperative position, the apparatus further comprising a spring in each recess urging the associated claw to an extended position.

5. Braking apparatus as claimed in claim 4 comprising pins on one of said members and elongated slots on the other of said members receiving said pins to drivingly couple the members together with said play.

6. Braking apparatus as claimed in claim 5, wherein said brake actuating means includes a support member for said ring member adapted for connection with brake means the support member being pivotally moved by the drive member to operative position when the ratchet means is operative.

7. Braking apparatus as claimed in claim 6 comprising a common shaft supporting said drive and driven member, said drive member being secured to said shaft for rotation therewith, said driven member being freely rotatable on said shaft, said drive and driven members being adjacent one another on the shaft with said ring member of the brake actuating means encircling both the drive and driven members.

8. Braking apparatus as claimed in claim 7, wherein said pins extend parallel to said shaft and said slots are circumferential.

9. Braking apparatus as claimed in claim 8 comprising an input drive member secured to said shaft and an output member secured to the driven member.

References Cited

UNITED STATES PATENTS 1,866,755  7/1932  Detilloux _____ 192—5

FOREIGN PATENTS 87,834  12/1895  Germany.
174,851  4/1935  Switzerland.

MARTIN P. SCHWADRON, *Primary Examiner.*

C. M. LEEDOM, *Assistant Examiner.*